(12) United States Patent
Corbel

(10) Patent No.: US 11,962,366 B2
(45) Date of Patent: Apr. 16, 2024

(54) SIGNAL MULTIPLEXER FOR SONAR

(71) Applicant: THALES, Courbevoie (FR)

(72) Inventor: Philippe Corbel, Brest (FR)

(73) Assignee: THALES, Courbevoie (FR)

( * ) Notice: Subject to any disclaimer, the term of this patent is extended or adjusted under 35 U.S.C. 154(b) by 320 days.

(21) Appl. No.: 17/293,411

(22) PCT Filed: Nov. 15, 2019

(86) PCT No.: PCT/EP2019/081527
§ 371 (c)(1),
(2) Date: May 12, 2021

(87) PCT Pub. No.: WO2020/099655
PCT Pub. Date: May 22, 2020

(65) Prior Publication Data
US 2021/0409070 A1    Dec. 30, 2021

(30) Foreign Application Priority Data
Nov. 15, 2018  (FR) ...................... 1871858

(51) Int. Cl.
*H04B 3/56* (2006.01)
*G01S 7/521* (2006.01)
*G10K 11/00* (2006.01)

(52) U.S. Cl.
CPC ............... *H04B 3/56* (2013.01); *G01S 7/521* (2013.01); *G10K 11/006* (2013.01); *H04B 2203/5487* (2013.01)

(58) Field of Classification Search
CPC .. H04B 3/56; H04B 3/546; H04B 2203/5487; H04B 3/54; G10K 11/006; G01S 7/521; G01S 15/88
(Continued)

(56) References Cited

U.S. PATENT DOCUMENTS 4,193,129 A * 3/1980 Wiggins ................ H04B 3/548
367/106
4,375,089 A   2/1983 Thigpen et al.
(Continued)

FOREIGN PATENT DOCUMENTS

CA   2591969 C  * 12/2010 ............... B63G 7/02
JP   2004-121847 A   4/2004
(Continued)

OTHER PUBLICATIONS

Shefter, "ROV and remote data gathering control, communications, and power supply over a single inexpensive coaxial cable using a low power multiplex system", Institute of Electrical and Electronics Engineers, Proceedings of the Oceans Conference, vol. 3, p. III-236-III241, Oct. 1993.
(Continued)

*Primary Examiner* — Emmanuel Bayard
(74) *Attorney, Agent, or Firm* — BakerHostetler

(57) ABSTRACT

A sonar includes a first part and a second part linked by an electric carrier cable configured to mechanically support the second part and allow the two parts of the sonar to exchange signals comprising: a unidirectional signal, called electrical power supply signal, unidirectional signals, called signals to be emitted, transmitted by the first part to the second part for them to be transmitted in the form of acoustic waves, and a bidirectional signal conveying communication data, the sonar wherein the first part comprises signal combination means configured for the signals to be transmitted simultaneously over the electric carrier cable, and in that the second part comprises separation means allowing the recovery of each of the signals transmitted over the electric carrier cable.

11 Claims, 3 Drawing Sheets

(58) Field of Classification Search
USPC .......................................... 375/219, 340, 357
See application file for complete search history.

(56) References Cited

U.S. PATENT DOCUMENTS

| | | | | |
|---|---|---|---|---|
| 4,641,290 | A * | 2/1987 | Massa | G10K 11/006 367/153 |
| 8,770,129 | B2 * | 7/2014 | Hawkes | B65H 75/425 114/328 |
| 10,241,220 | B2 * | 3/2019 | Pearce | B06B 1/0688 |
| 2002/0013106 | A1 * | 1/2002 | Healey | G01S 7/521 440/6 |
| 2014/0063493 | A1 * | 3/2014 | Nash | G01J 1/44 356/226 |
| 2016/0327640 | A1 * | 11/2016 | Seite | G01S 7/521 |
| 2017/0122536 | A1 * | 5/2017 | Noga | A01K 79/00 |
| 2017/0371071 | A1 * | 12/2017 | Moulinier | G01V 1/38 |

FOREIGN PATENT DOCUMENTS

| | | |
|---|---|---|
| JP | 2012-8830 A | 1/2012 |
| JP | 2013-208295 A | 10/2013 |

OTHER PUBLICATIONS

Manoj, et al., "Design, Simulation and Comparison of Mixing Schemes for DC, AC and Bidirectional Data through Coaxial Cable", Procedia Computer Science, vol. 93, pp. 578-584, 2016.

Thales, "Flash Dipping Sonar Folding light Acoustic System for Helicopter", retrieved from http://www.thales7seas.com/html_2014/products/214/thales_Flash_Dipping_Sonar.pdf, 2012.

Notification of Reason(s) for Refusal issued in Japanese Patent Application No. JP2021-526412 dated Jul. 4, 2023, with English translation.

* cited by examiner

State of the art

SIGNAL MULTIPLEXER FOR SONAR

CROSS-REFERENCE TO RELATED APPLICATIONS

This application is a National Stage of International patent application PCT/EP2019/081527, filed on Nov. 15, 2019, which claims priority to foreign French patent application No. FR 1871858, filed on Nov. 15, 2018, the disclosures of which are incorporated by reference in their entirety.

FIELD OF THE INVENTION

The invention relates to the field of SONAR (acronym for SOund NAvigation and Ranging) equipment and deals more particularly with the sonars composed of two parts linked to one another by a cable responsible for ensuring the exchange of signals.

BACKGROUND

The sonars are devices that use the properties of propagation of sound in water to detect and locate submarine objects. They are used notably in the field of defense for the detection of submarines or of mines.

The sonars are often composed of two parts:
a first part, called emerged part, generally located on board a surface vessel such as a boat or an aircraft. Emerged part is understood to mean the fact that it is not intended to be plunged into the water. That does not make it incompatible with use in an immersed vessel, such as a submarine. This part performs at least the generation of the power signals emitted by the immersed part of the sonar and of a signal allowing the electrical power supply for the immersed part. It also comprises the electronics needed to exchange communication data with the immersed part. Advantageously, it can have the digital electronics needed to analyze the signals acquired by the immersed part for the detection of sources;
a second part, called immersed part, because it is intended to be immersed to transmit the sonar signals under the water. This part is primarily composed of acoustic transducers allowing the emission and reception of submarine signals. It also comprises the electronics needed for the acquisition of the submarine signals, the digitization thereof and the transmission thereof to the emerged part.

FIG. 1 represents an example of two-part sonar for the detection of submarines, when on board a helicopter. The emerged part of the sonar is positioned inside the helicopter 101, while the immersed part 102 is under the sea, at depths that can reach a few hundreds of meters. The two parts are linked by an electric carrier cable 103. This cable is wound around a winch placed on board the helicopter allowing the immersed part of the sonar to be raised and lowered, and for it to be maintained in position. The cable 103 is armored, that is to say that its structure is reinforced so as to withstand the weight of the immersed part and its own weight. The length of the cable can reach a few hundreds of meters. As an illustration, Thales develops a sonar called Sonar Flash, for which the immersed part of the equipment is linked to the emerged part by a coaxial cable of more than 700 meters.

The electric carrier cable is therefore responsible for securing the immersed part of the sonar and serves as a medium for the transmission of electrical signals. Three types of signal are generally transmitted between the two parts of the sonar:
signals to be emitted, high-power analog signals. These signals are generated by the emerged part and are intended to be emitted by the acoustic transducers of the immersed part. As an illustration, in the Sonar Flash case, the signals emitted have a power of 10 kW at an alternating voltage of 2500 V rms,
an electrical power supply signal, ensuring the supply of electrical energy for the immersed part of the sonar. This signal is generally a direct current signal or a low-frequency alternating signal (50 Hz to 400 Hz),
a bidirectional signal allowing the transmission of communication data between the two parts of the sonar, transmitting, among other things, in one direction the management and control/command data for the immersed part, and in the other direction information on the state of the immersed part of the sonar and the digitized acquired signals.

The helicopter-winched sonars of the state of the art, like the Sonar Flash for example, use a coaxial electric carrier cable as medium for the transmission of the various signals. They are transmitted in succession over the cable, which is thus time-shared between the different functions. However, such a time-division multiplexing causes cut-off on each of the signals, in particular on the electrical power supply signal. Equipment dedicated to ensuring the continuity of signals, such as energy storage devices (batteries) for the electrical power supply signal, must then be implemented in the immersed part. Active power switching elements, such as power relays, must also be implemented in the immersed part and constitute sources of unreliability. All that is reflected in the weight and the volume of the immersed part, and therefore in the diameter of the electric carrier cable, and in the overall volume and weight. It is therefore desirable to have a solution which allows the weight and the volume of the immersed part to be reduced, while improving its reliability.

Furthermore, the average bit rate of the signal conveying the communication data is limited according to the time-division resources which are allocated to it. Advances in component miniaturization and in increasing computation powers for the processing of the signals are causing the sonars to take on more and more sensors. The requirements in terms of quantities of data conveyed then increase accordingly. A solution therefore has to be found that makes it possible to increase the average bit rates of this signal.

The problem posed is therefore threefold: to lighten the device, to increase its reliability and to increase the bit rate allocated to the signal conveying the communication data.

To increase the bit rate of the signal conveying the communication data, it would be possible to have multiple transmission lines in parallel within the cable, one for each type of signal, instead of a single transmission line. That would make it possible to eliminate the power switching and energy storage devices of the immersed part. However, by increasing the number of transmission lines, the section of the cable and its weight would increase, which would raise the problem of the bulk of the drum needed to haul in the cable over its entire length, and the problem of the mechanical stresses exerted on the cable and the drum. This solution is therefore not suitable, in particular when the sonar is on board a helicopter.

In order to address the problem posed while resolving the problems raised by the prior art, the invention proposes continuously and simultaneously transmitting all of the signals (electrical power supply, emissions and communication data) by combining the different signals, each type of signal using a frequency band which is specific to it. Such a combination is not considered in the prior art because it amounts to transmitting, over one and the same medium, heterogeneous signals having very different characteristics: high-power signals, such as the signals intended to be emitted by the immersed part and whose voltage can reach several thousands of volts and a power of several tens of kilowatts, with signals of lower power, like the signal conveying the communication data. These signals, by their different powers and their different frequency bands, impose constraints that are very different and not necessarily compatible on the components used in the sonar.

To mix the different signals transmitted over the electric carrier cable, the invention proposes implementing, on the one hand, signal combination means and, on the other hand, signal separation means. A practical example of implementation of such a device, optimized so as to reduce the weight and the volume of the second part of the sonar, is given in FIG. 3 and described in detail.

SUMMARY OF THE INVENTION

To this end, the invention relates to a sonar comprising a first part and a second part linked by an electric carrier cable configured to mechanically support the second part and allow the two parts of the sonar to exchange signals. The signals transmitted comprise:

- a unidirectional signal, called electrical power supply signal, by which the first part transmits an electrical power supply to the second part,
- analog unidirectional signals, called signals to be emitted, transmitted by the first part to the second part for them to be emitted in the form of acoustic waves, and
- a bidirectional signal conveying communication data exchanged between the two parts.

In the sonar according to the invention, the first part comprises signal combination means, configured so that the electrical power supply signal, the signals to be emitted and the signal conveying communication data are transmitted simultaneously and in different frequency bands over the electric carrier cable. Furthermore, the second part comprises separation means allowing the recovery of each of the signals transmitted over the electric carrier cable, one or more emission acoustic transducers (Tr), and tuning/matching means (L1) for the emission acoustic transducer or transducers.

Advantageously, the electric carrier cable comprises a single transmission line.

In one embodiment, the combination means comprise components configured to couple the signals to be emitted with the electrical power supply signal. These components can advantageously comprise a transformer configured to raise the voltage of the signals to be emitted and couple them with the electrical power supply signal. They can also comprise components configured to guide the propagation of the signals toward the electric carrier cable. In one embodiment, the components configured to guide the propagation of the signals toward the electric carrier cable comprise:

- an inductor configured to allow the electrical power supply signal and the signals to be emitted to pass and to restrict the propagation of the signal conveying the communication data, said inductor being connected between, on one side, the electric carrier cable and, on the other side, elements for generating the signals to be emitted and for generating the electrical power supply signal, and
- a filter configured to allow the signal conveying the communication data to pass and to restrict the propagation of the electrical power supply signal and of the signals to be emitted, said filter being connected between the electric carrier cable and a generator of the signal conveying the communication data.

Advantageously, the separation means comprise an inductor configured to both separate the electrical power supply signal from the other signals conveyed by the electric carrier cable and to perform the tuning/matching of the acoustic transducer or transducers. In one embodiment, this inductor is mounted in parallel with the acoustic transducer or transducers and is connected between the electric carrier cable and a capacitor with which it is mounted in series, the electrical power supply signal being recovered at the terminals of said capacitor.

Advantageously, the inductor is configured to allow the electrical power supply signal to pass and to restrict the propagation of the signal conveying the communication data and the signals to be emitted.

In one embodiment of the sonar according to the invention, the separation means comprise:

- an inductor configured to allow the signals to be emitted to pass and to restrict the propagation of the signal conveying the communication data, said inductor being connected between the electric carrier cable and the emission acoustic transducer or transducers, and
- a filter configured to allow the signal conveying the communication data to pass and to restrict the propagation of the electrical power supply signal and of the signals to be emitted, said filter being connected between the electric carrier cable and the element for modulating/demodulating the signal conveying the communication data.

In the sonar according to the invention, the electrical power supply signal can be contained within a portion of the spectrum ranging from 0 to 400 Hz, the signals to be emitted can be contained within a portion of the spectrum ranging from 1 kHz to 200 kHz and the signal conveying the communication data can be contained within a portion of the spectrum higher than 200 kHz.

In one embodiment of the sonar according to the invention, the signal conveying the communication data is modulated by a zero-average modulation. Advantageously, the modulation uses an orthogonal frequency-division multiplexing, or OFDM.

BRIEF DESCRIPTION OF THE DRAWINGS

The invention will be better understood and other features and advantages will become more apparent on reading the following description, given as a nonlimiting example, and from the attached figures in which.

DETAILED DESCRIPTION

Hereinbelow, when the same references are used in different figures, they designate the same elements.

Figure 1:
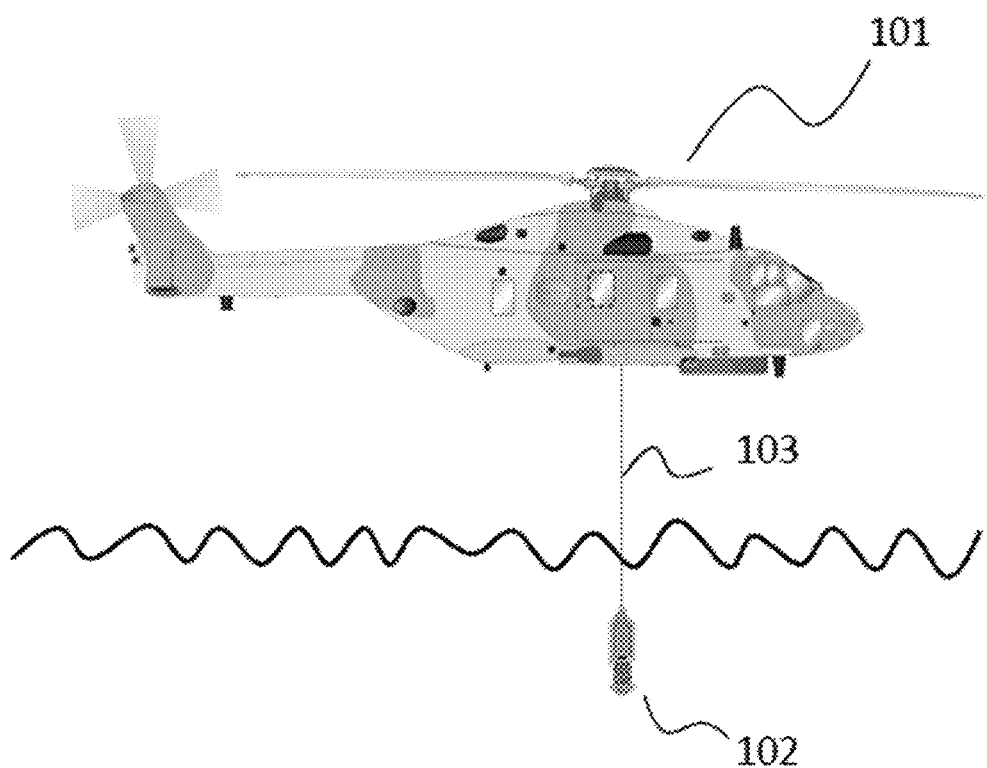
FIG. 1 presents an example of helicopter-winched sonar composed of two parts.
Figure 2:
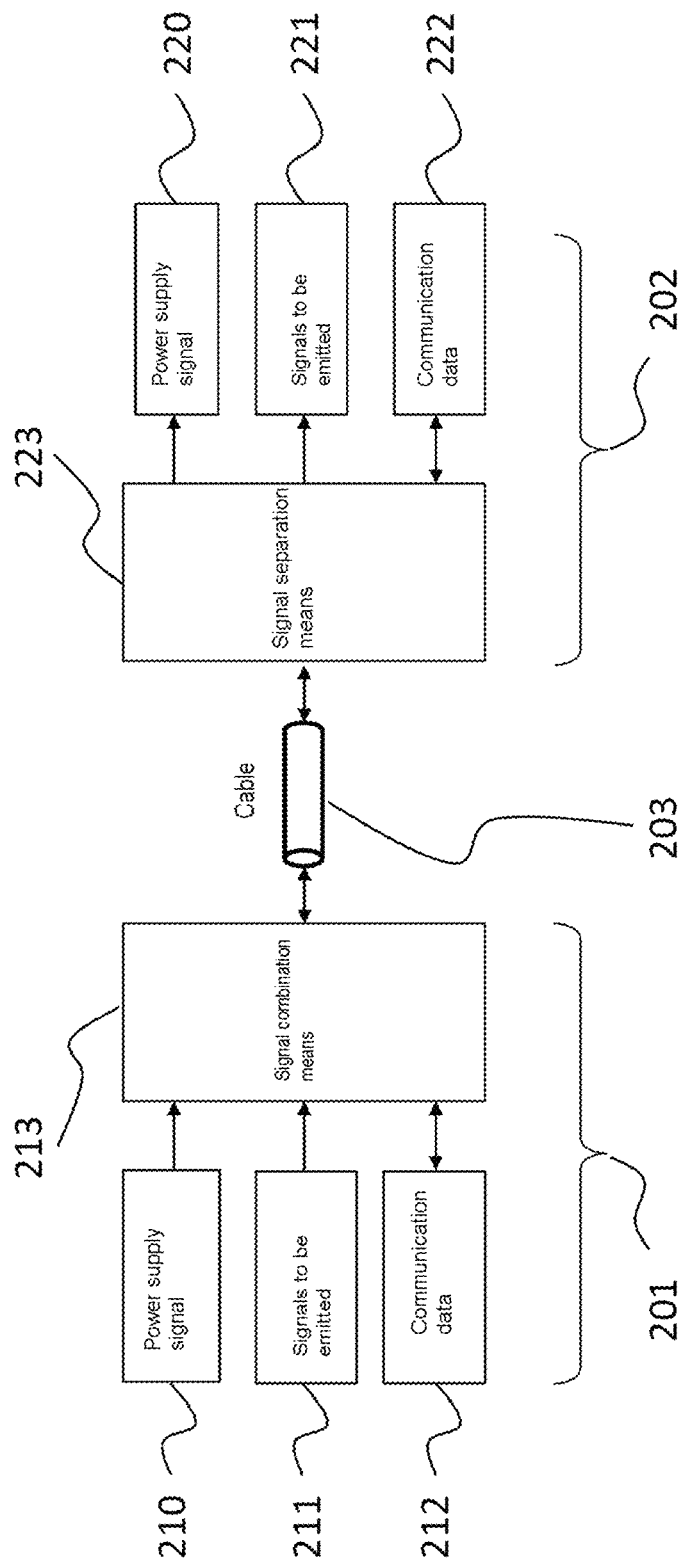
FIG. 2 represents an embodiment of a sonar according to the invention.

FIG. 2 represents an embodiment of a sonar according to the invention comprising two parts 201 and 202 separated and linked by an electric carrier cable 203. The sonar has a first part 201, called emerged part, intended to be installed on board a vessel such as a ship, an aircraft or a submarine, and a second part 202, called immersed part, intended to be plunged into the water. The electric carrier cable 203 provides a mechanical support function for the second part 202, and a signal transmission function between the two parts 201 and 202 through one and the same transmission line, the signals including:

- an electrical power supply signal 210. This signal is intended to ensure the operation of the immersed part of the sonar. It is generally a direct signal, but can equally be an alternating signal having a frequency of a few tens of Hz. The signal can equally be generated by the emerged part 201 of the sonar when it has energy storage means (batteries), or supplied by an external electrical power source to which the sonar is linked;
- signals to be emitted 211. These are electrical signals intended to be emitted under the water by the immersed part of the sonar in the form of acoustic waves. These signals are high-power signals transmitted at high frequency (typically, from a kHz to a few hundreds of kHz). The signals to be emitted 211 convey a high power that can reach several tens of kilowatts. In order to limit the intensity of the current of the signals to be emitted 211, the voltage can then exceed several thousands of volts. The signals to be emitted are generated by the first part of the sonar, then transmitted to the second part of the sonar which emits them using acoustic transducers; and
- a bidirectional communication signal 212. The data transmitted on the downlink (that is to say, from the emerged part 201 of the sonar to the immersed part 202) correspond essentially to configuration data, whereas the data transmitted on the uplink (that is to say, from the immersed part of the sonar to the emerged part) correspond primarily to the acoustic signals acquired, amplified and possibly digitized by the immersed part of the sonar, and to data concerning the state of that part. The quantities of data transmitted on the uplink and on the downlink of the bidirectional signal conveying the communication data are not therefore symmetrical, the bit rate requirement being greater on the uplink than on the downlink. The emerged part 201 of the sonar has the electronics needed for the generation (modulation, coding) and for the reception (demodulation, decoding) of the signal conveying the communication data. The up and down links can share the same spectral resource, according to methods known to the person skilled in the art like TDD (Time-Division Duplex), or each have a specifically dedicated frequency band, according to the known methods such as FDD (Frequency-Division Duplex). They are transmitted on carrier frequencies that are higher than the signals 210 and 211.

The emerged part 201 of the sonar can also have computation means allowing it to proceed with the analysis of the signals acquired by the immersed part of the sonar.

It also has means 213 allowing the different signals to be combined. The function of these means is to ensure that the power supply signal 210, the signals to be emitted 211 and the communication data simultaneously use the same transmission medium in the electric carrier cable 203, in this case a single transmission line such as a coaxial cable, without threatening the equipment responsible for the generation of each of these signals. Simultaneously is understood to mean the fact that each signal can be transmitted continuously, without being interrupted by the other signals.

The immersed part 202 is configured to transform the signals to be emitted 211 that it receives from the first part 201 into acoustic waves emitted in the water, and to receive the acoustic waves that are propagated in the water. To this end, the second part therefore comprises acoustic transducers, some being configured to emit and others being configured to acquire acoustic signals. The acoustic transducers are most often piezoelectric elements whose electrical behavior is mostly capacitive. The implementation of a tuning/matching array for the acoustic transducers makes it possible to minimize the power losses on the signals to be emitted.

The second part 202 also comprises the electronics needed for the amplification of the signals acquired by acoustic transducers operating in reception, their possible digitization, and their transmission to the emerged part 201 of the sonar.

Finally, the immersed part 202 of the sonar also has separation means 223 for separating the different signals. These separation means make it possible to separately recover an electrical power supply signal 220, signals to be emitted 221 and communication data 222.

The device according to the invention therefore allows for a more flexible operation than the devices of the state of the art, because all the signals to be transmitted over the cable are available at each instant, transparently and without interruption. It thus offers numerous advantages, including:

- all the signals take the same transmission line, which allows the diameter and the weight of the electric carrier cable 203 to be controlled. A simple coaxial cable or a twisted pair can thus serve as transmission line,
- the device does not require the implementation of electromechanical switching elements (such as, for example, a power relay) in its immersed part, which reduces its volume, its weight, its cost, nor does it require the transmission of the signals and the switching elements to be synchronized, which enhances the reliability of the system and simplifies it. The control circuitry can then be eliminated from the immersed part,
- the temporal continuity of the electrical power supply signal 220 is ensured, the immersed part then being able to dispense with the use of energy storage elements (batteries), which reduces its volume, its weight, its cost, and enhances its reliability,
- the temporal continuity of the communication data 222 is assured, which means that the quantity of data conveyed, and therefore the number of acoustic sensors of the immersed part, can be increased,
- all of the above advantages make it possible to reduce the weight and the bulk of the immersed part of the sonar, and therefore its hydrodynamic performance, as well as the size of the electric carrier cable, and that of the drum needed to haul it in.

The signal carrying the communication data can equally take the form of an analog or digital signal. Any modulation/coding scheme can be used. Advantageously, the sonar uses a zero-average modulation in order not to have any direct component. Indeed, such a component would be superimposed on the power supply signal. More advantageously, it implements error-correcting codes, in order to enhance the quality of the transmission over a cable in which the electrical performance levels can prove low and are subject to variability, notably through the length of the cable, its hauled in/paid out state, or its aging. Advantageously, the communication signals are modulated according to an orthogonal frequency-division multiplexing technique, such as, for example, OFDM modulation. In fact, such a modulation scheme makes it possible to achieve very high bit rates for a given spectrum occupancy, and is compatible with the use of error-correcting codes that allow the transmission quality to be enhanced. OFDM also offers very great flexibility in adapting the spectral resource, which makes it possible to dynamically adapt the allocation of the frequency resource to both transmission directions.

One example of implementation of the invention consists in installing, in each of the parts of the sonar, filtering elements matched to each of signals transmitted, on the one hand allowing them to be combined without interference, and on the other hand allowing them to be separated. More specifically, according to one embodiment, these elements can be a low-pass filter for the electrical power supply signal, a bandpass filter for the signals to be emitted, and a bandpass or high-pass filter for the signal conveying the communication data. These filters can be designed based on networks of resistors, inductors and capacitors. However, with respect to the power electronics, the components must withstand very high power and voltage levels at low frequencies (a few hundreds of kilohertz), which imposes a significant volume and weight. Among the components implemented in the filters, the inductors generally form the greatest contribution in terms of volume and weight, which is then reflected in the dimensioning of the cable 203 and of the associated drum. Furthermore, these components are very costly. Their number must therefore be limited, particularly in the immersed part of the sonar.

Figure 3:
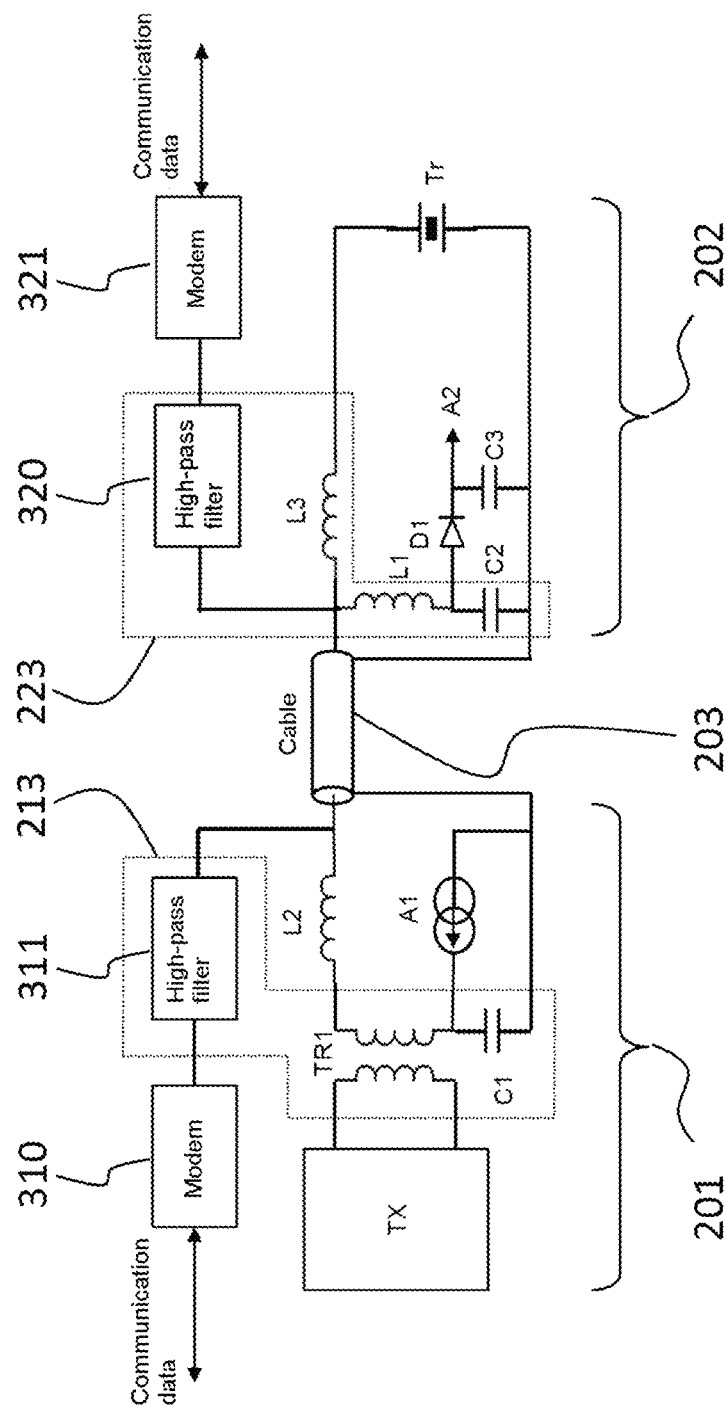
FIG. 3 represents an advantageous embodiment of a sonar according to the invention.

To this end, FIG. 3 describes the main elements of a sonar according to one implementation of the invention, optimized in order to limit the number of elements used. The embodiment presented exploits the significant frequency differences which exist between the signals to be transmitted. To this end, components acting as combination means are implemented in the emerged part. These components are configured for the electric carrier cable 203 to exhibit the impedance with the best match to the frequency of each of the signals 210, 211 and 212, so that these signals are guided to the electric carrier cable 203, thus minimizing any return of these signals to the respective generation elements. Likewise, in the immersed part, components acting as separation means are implemented. These components are configured to exhibit impedances matched to the frequencies of the signals in order to separately conduct each signal conveyed by the electric carrier cable 203 to its destination.

Just like FIG. 2, FIG. 3 represents a sonar comprising a first emerged part 201, intended to be installed on board a ship, an aircraft or a submarine, a second part 202, intended to be immersed under the water in order to emit the acoustic signals allowing for the detection of targets, the two parts being linked by an electric carrier cable 203 which ensures the securing of the immersed part and the transmission of signals between the emerged part and the immersed part of the sonar.

The emerged part 201 comprises an emitter TX intended to generate the signals to be emitted. These signals generally have a power of a few kilowatts, modulated in a frequency band ranging from a kilohertz, for the very low-frequency sonars, to a few hundreds of kilohertz, for the high-frequency sonars. The carrier frequency of the signals to be emitted can be made to change over time.

The immersed part also comprises an electrical power supply source A1, represented in the figure as a direct current source, and a modem 310, which generates/receives the signal conveying the communication data. The modem 310 also handles the synchronization of the signal conveying the communication data on the up and down links. The electrical power supply source A1 can be a direct or alternating power source, belonging to the sonar or originating from an external source to which the sonar is linked.

The emerged part 201 comprises means 213 allowing the signal 210 delivered by the power supply A1 to be combined with the signals 211 delivered by the emitter TX and the signals 212 conveying the communication data supplied by the modem 310.

To this end, in this embodiment, the emerged part 201 comprises a transformer TR1, whose role is to raise the voltage of the signals to be emitted and therefore to match the working impedance of the electronics to that of the acoustic transducers in order to limit the power losses of these signals in their transmission over the entire length of the electric carrier cable 203. The implementation of the transformer TR1 is not strictly essential, but it does make it possible to considerably improve the transmission of the signals to be emitted between the first part and the second part of the sonar and to couple the electrical power supply signal with the signals to be emitted. It therefore has a dual role because it performs the raising of the voltage of the signals to be emitted and at the same time contributes to the aggregation of the electrical power supply signal with the signals to be emitted.

The electrical power supply source A1 is connected via the secondary of the transformer TR1. In order for the electrical power supply voltage to be superimposed with the voltage delivered by the transformer, a capacitor C1 is mounted in parallel with the electrical power supply source. Without this capacitor, the voltage delivered by the transformer would return to the electrical power supply, which would cause the immersed part of the sonar to no longer receive either the electrical power supply or the signals to be emitted, and would probably destroy the electrical power supply A1. The capacitor C1 mounted in parallel with the electrical power supply source therefore makes it possible to couple the signals to be emitted with the electrical power supply signal.

The communication data are generated/received by a modem 310 and linked to the other signals through a high-pass (or bandpass) filter 311. This high-pass filter, connected so as to separate the modem 310 from the input of the cable 203, has an impedance much higher than the input of the cable at the frequencies of the electrical power supply signal and of the signals to be emitted. Thus, it makes it possible to prevent the coupled signal, signals to be emitted and electrical power supply signal, from returning to the modem 310, which directs it to the electric carrier cable 203 and therefore to the immersed part 202 of the sonar. Advantageously, the high-pass filter is designed so as to withstand the high voltages of the signals to be emitted, such as, for example, by using components designed to sustain high voltage levels, or by joining in series elements designed for lower voltage levels.

An inductor L2 is connected between the cable 203 and the transformer TR1, so as to separate the part handling the combination of the signals to be emitted with the electrical power supply signal, from the part dedicated to the transmission of the signal conveying the communication data. This inductor has a high impedance at the frequencies used by the signal conveying the communication data, so as to prevent this signal from returning to the emitter and the electrical power supply source, which guides it to the cable 203 and therefore to the immersed part 202 of the sonar. The voltages of the three types of signals transmitted are then superimposed.

In this embodiment, the signal combination means 213 therefore comprise the capacitor C1, the high-pass filter 311 and the inductor L2.

The electric carrier cable 203 ensures the mechanical securing of the immersed part 202, and the transmission of the combined signals through a single transmission line.

The immersed part 202 comprises means 223 for separating the signals transmitted over the electric carrier cable 203. In the embodiment described in FIG. 3, these means 223 comprise a high-pass filter 320, comparable to the high-pass filter 311, which has a high impedance at the frequency of the electrical power supply signal and at the frequency of the signals to be emitted, in order to restrict the propagation of the signals to be emitted and of the electrical power supply signal by attenuating the low frequencies while allowing the high frequency signals to pass. The role of the high-pass filter is to totally block the propagation of the signals to be emitted and of the electrical power supply signal, but residues of these signals can nevertheless pass through the filter, which is why it is said that it "restricts" the propagation of these signals. It therefore allows the signal conveying the communication data to be separated from the other signals. Advantageously, just like the high-pass filter 311 of the first part 201 of the sonar, the high-pass filter 320 of the second part 202 of the sonar is designed so as to withstand the high voltages of the signals to be emitted. It is disposed between the electric carrier cable 203 and a modem 321, hanging from the modem 310 of the emerged part 201, configured to synchronize with the modem 310 in order to generate and receive the signal conveying the communication data. The modem is linked to reception acoustic transducers (not represented) via amplifiers and, if necessary, analog/digital converters (not represented).

The signal separation means 223 of this embodiment also comprise two inductors L1 and L3, which have a high impedance at the frequencies of the signal conveying the communication data, and a capacitor C2. The inductor L1 is mounted in series with the capacitor C2. The electrical power supply signal A2 is recovered at the terminals of the capacitor C2. The inductor L1 separates the capacitor C2 from the electric carrier cable 203. The inductor L3 is mounted in series with the acoustic transducer or transducers Tr, that it separates from the electric carrier cable 203. The inductors L1 and L3 exhibit a high impedance at the frequency of the signal transmitting the communication data, in order to prevent the propagation of this signal to the emission acoustic transducers Tr and to the components allowing the recovery of the electrical power supply A2, that is to say the capacitor C2, and if necessary the diode D1 and the capacitor C3. Indeed, while in practice the signal conveying the communication data does not disrupt the operation of the acoustic transducers and of the electrical power supply, restricting the propagation of this signal at L1 and L3 makes it possible to direct all the power of the signal conveying the communication data to the modem 321. Furthermore, the inductors L1 and L3 guide the uplink communications emitted by the modem 321 intended for the modem 310 to the electric carrier cable, and not to the acoustic transducers Tr or the part allowing the recovery of the electrical power supply A2.

The inductor L1 mounted in parallel with the acoustic transducer or transducers, the inductor L3, mounted in series with the acoustic transducer or transducers, and the acoustic transducer or transducers which behave as capacitive elements, advantageously form an LC resonator tuned to the frequency of the signals emitted by the sonar, so as not to lose power in the emission of the acoustic signals. The inductors L1 and L3 therefore form tuning/matching means for the emission acoustic transducer or transducers Tr.

Furthermore, the inductor L1 is configured to exhibit a sufficient impedance at the frequency of the signals to be emitted to be able to recover the power supply signal alone at the terminals of the capacitor C2.

In one embodiment, the value of the inductor L1 mounted in parallel with the emission acoustic transducer or transducers Tr is chosen as a function of the impedance of the emission acoustic transducers at the frequency of the signals to be emitted, so that it primarily handles the tunings/matching of the emission acoustic transducer or transducers Tr. The value of the inductor L3 is chosen to be lower than that of L1, so as not to detune the LC network formed by L1 and the emission acoustic transducer or transducers. The role played by the inductor L1 is therefore twofold: it allows the recovery of the electrical power supply signal by filtering a part of the signals to be emitted and the communication signals, and at the same time contributes to the tuning/matching of the emission acoustic transducers Tr. By using the same inductor L1 to filter the electrical power supply signal and to handle the tuning/matching of the acoustic transducers used in emission, the number of components needed to implement the immersed part of the sonar according to this embodiment of the invention is reduced to the minimum.

The inductor L3 does not block the propagation of the power supply signal to the acoustic transducer or transducers Tr, but these elements are essentially capacitive and do not consume direct voltage. The power of the power supply signal is then propagated primarily through L1 to the capacitor C2 (and the capacitor C3 if appropriate).

In this embodiment, the signal separation means 223 therefore comprise the capacitor C2, the high-pass filter 320 and the inductors L1 and L3.

The setup of FIG. 3, in particular the positioning of the inductors L1 and L3, would not obviously appear to the person skilled in the art. Indeed, the dimensioning of the two inductors must satisfy a certain number of demands which can seem contradictory at first glance, namely:

i. L3 must have an impedance much higher than the characteristic impedance of the cable 203 at the minimum frequency used by the signal conveying the communication data, so as not to detune the high-pass filter 320, ii. the impedance of L3 must not be too high at the frequency of the signals to be emitted, in order not to lose too much power in the emission acoustic transducer or transducers, iii. the impedance of L1 must be much higher than the characteristic impedance of the cable 203 at the minimum frequency used by the signal conveying the communication data, and higher than that of L3 at the frequency of the signals to be emitted, iv. the values of L1 and L3 must be chosen so as to perform the tuning/matching of the emission acoustic transducers Tr.

In practice, it has been found that it is possible to determine values of L1 and L3 which satisfy all of the above constraints.

Advantageously, the immersed part 202 can have a diode D1 and a capacitor C3, disposed so as to filter the electrical power supply signal. This filtering makes it possible to smooth the fluctuations of the electrical power supply signal due to the residues of the signals to be emitted which pass through L1.

The setup represented in FIG. 3 limits to the maximum the number of electronic elements necessary to the implementation of a sonar according to the invention, thus making it possible to reduce its cost, but above all the weight and the volume of the immersed part 202 of the sonar. Obviously, the implementation described for the first part 201 of the sonar and the implementation described for the second part 202 of the sonar are independent and can be considered independently.

The invention claimed is:

1. A sonar comprising a first part and a second part linked by an electric carrier cable configured to mechanically support the second part and allow the two parts of the sonar to exchange signals, comprising:
a unidirectional signal, being an electrical power supply signal, by which the first part transmits an electrical power supply to the second part,
analog unidirectional signals, being signals to be emitted, transmitted by the first part to the second part to be emitted in the form of acoustic waves, and
a bidirectional signal conveying communication data exchanged between the two parts,
wherein the first part comprises signal combination means configured so that the electrical power supply signal, the signals to be emitted and the signal conveying communication data are transmitted simultaneously and in different frequency bands over the electric carrier cable, and
the second part comprises separation means allowing recovery of each of the signals transmitted over the electric carrier cable, one or more emission acoustic transducers, and tuning/matching means of the emission acoustic transducer or transducers.

2. The sonar as claimed in claim 1, wherein the combination means comprise components configured to couple the signals to be emitted with the electrical power supply signal.

3. The sonar as claimed in claim 2, wherein the components configured to couple the signals to be emitted with the electrical power supply signal comprise a transformer configured to raise the voltage of the signals to be emitted and couple said signals to be emitted with the electrical power supply signal.

4. The sonar as claimed in claim 1, wherein the combination means comprise components configured to guide the propagation of the signals toward the electric carrier cable.

5. The sonar as claimed in claim 4, wherein the components configured to guide the propagation of the signals toward the electric carrier cable comprise:
an inductor configured to allow the electrical power supply signal and the signals to be emitted to pass and to restrict the propagation of the signal conveying the communication data, said inductor being connected between, on one side, the electric carrier cable, and on the other side, elements for generating the signals to be emitted and for generating the electrical power supply signal, and
a filter configured to allow the signal conveying the communication data to pass and to restrict the propagation of the electrical power supply signal and of the signals to be emitted, said filter being connected between the electric carrier cable and a generator of the signal conveying the communication data.

6. The sonar as claimed in claim 1, wherein the separation means comprise an inductor configured to separate the electrical power supply signal from the other signals conveyed by the electric carrier cable and contribute to the tuning/matching of the acoustic transducer or transducers.

7. The sonar as claimed in claim 6, wherein the inductor configured to separate the electrical power supply signal from the other signals and to perform the tuning/matching of the emission acoustic transducer or transducers is mounted in parallel with the acoustic transducer or transducers and is connected between the electric carrier cable and a capacitor with which the inductor is mounted in series, the electrical power supply signal being recovered at the terminals of said capacitor.

8. The sonar as claimed in claim 6, wherein the inductor configured to separate the electrical power supply signal from the other signals and to perform the tuning/matching of the emission acoustic transducer or transducers is configured to allow the electrical power supply signal to pass and to restrict the propagation of the signal conveying the communication data and the signals to be emitted.

9. The sonar as claimed in claim 1, wherein the separation means comprise:
an inductor configured to allow the signals to be emitted to pass and to restrict the propagation of the signal conveying the communication data, said inductor being connected between the electric carrier cable and the emission acoustic transducer or transducers, and
a filter configured to allow the signal conveying the communication data to pass and to restrict the propagation of the electrical power supply signal and of the signals to be emitted, said filter being connected between the electric carrier cable and element for modulating/demodulating the signal conveying the communication data.

10. The sonar as claimed in claim 1, wherein the signal conveying the communication data is modulated by a zero-average modulation.

11. The sonar as claimed in claim 1, wherein the signal conveying the communication data uses an orthogonal frequency-division multiplexing.

* * * * *